(12) United States Patent
Kurz et al.

(10) Patent No.: US 12,546,888 B2
(45) Date of Patent: Feb. 10, 2026

(54) METHOD AND PROCESSOR CIRCUIT FOR OPERATING A RADAR SYSTEM COMPRISING MULTIPLE ANTENNAS, RADAR SYSTEM AND MOTOR VEHICLE

(71) Applicant: Volkswagen Aktiengesellschaft, Wolfsburg (DE)

(72) Inventors: Heiko Gustav Kurz, Hannover (DE); Marc-Michael Meinecke, Sassenburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 596 days.

(21) Appl. No.: 17/878,846

(22) Filed: Aug. 1, 2022

(65) Prior Publication Data

US 2023/0041793 A1  Feb. 9, 2023

(30) Foreign Application Priority Data

Aug. 9, 2021  (DE) .......................... 102021208627.6

(51) Int. Cl.
*G01S 13/931* (2020.01)
*G01S 13/89* (2006.01)

(52) U.S. Cl.
CPC ............ *G01S 13/931* (2013.01); *G01S 13/89* (2013.01)

(58) Field of Classification Search
CPC combination set(s) only.
See application file for complete search history.

(56) References Cited

U.S. PATENT DOCUMENTS

| 6,252,540 | B1 | 6/2001 | Hale et al. |
| 8,744,744 | B2 | 6/2014 | Takagi |
| 10,724,854 | B2 | 7/2020 | Natroshvili |
| 12,266,080 | B2 * | 4/2025 | Yoneji ..................... G01S 17/89 |
| 2018/0218519 | A1 * | 8/2018 | Almutiry ................ G06F 18/22 |
| 2020/0278444 | A1 * | 9/2020 | Va ........................ G06V 40/172 |

(Continued)

FOREIGN PATENT DOCUMENTS

| DE | 102010011629 A1 | 1/2011 |
| DE | 102017123904 A1 | 4/2019 |

OTHER PUBLICATIONS

DE102021208627.6. Office Action (Mar. 25, 2022).

(Continued)

*Primary Examiner* — Vladimir Magloire
*Assistant Examiner* — Eric K Hodac
(74) *Attorney, Agent, or Firm* — Peter Zura; LOZA & LOZA, LLP

(57) ABSTRACT

System and method for operating a radar system that includes a plurality of antennas, wherein a respective antenna signal is received from each of the antennas and is converted into a digital antenna signal via an analog-to-digital conversion. Digital signal data of the antennas are provided in a data memory. Signal evaluation is performed in a two-stage design, where a predetermined subset of the signal data is supplied to an evaluation module for a target detection, and resolution cells for which, the associated resolution gate meets a predetermined occupancy criterion are selected, and only the signal data available in the data memory for the selected resolution cells are selected for these resolution cells for further processing.

20 Claims, 4 Drawing Sheets

(56) References Cited

U.S. PATENT DOCUMENTS

2022/0196798 A1\* 6/2022 Chen .................... G01S 7/354
2023/0010398 A1\* 1/2023 Wall .................... G01S 13/103

OTHER PUBLICATIONS

De Martini et al. "kRadar++: Coarse-to-Fine FMCW Scanning Radar Localisation." Department of Engineering Science, Oxford Robotics Institute, University of Oxford, Oxford, UK. MDPI. Sensors 2020, 20(21), 6002 https://doi.org/10.3390/s20216002.

\* cited by examiner

METHOD AND PROCESSOR CIRCUIT FOR OPERATING A RADAR SYSTEM COMPRISING MULTIPLE ANTENNAS, RADAR SYSTEM AND MOTOR VEHICLE

RELATED APPLICATIONS

The present application claims priority to German Patent App. No. 10 2021 208 627.6, to Kurz et al., filed Aug. 9, 2021, the contents of which being incorporated by reference in their entirety herein.

TECHNICAL FIELD

The present disclosure relates to a method for operating a radar system comprising multiple antennas, wherein, in consecutively conducted measurement cycles, a processor circuit receives a respective antenna signal in each case from each of the antennas, which is converted into a digital antenna signal by means of analog-to-digital conversion, resulting in a more efficient processing of the digitized antenna signals. The present disclosure also encompasses a processor circuit for carrying out the method in a radar system and a radar system comprising such a processor circuit. Additionally, the present disclosure also encompasses a motor vehicle comprising the radar system.

BACKGROUND

A radar system can be provided in a motor vehicle, for example, for supporting an automated driving function (that is, a partially autonomous or fully autonomous driving function) to detect objects in an environment of the motor vehicle and calculate a driving trajectory for the motor vehicle as a function of the detected objects. Sensing the environment as reliably as possible is indispensable for automated driving. In the process, the environment is detected by way of sensors, such as radar, LIDAR and camera. A comprehensive 360° 3D detection of the environment is particularly important, so that all static and dynamic objects and the relative positions thereof with respect to the motor vehicle are detected.

Radar sensor have become established in the automotive sector and supply data in all weather conditions in a reliable and fail-safe manner. Even poor visibility conditions, such as rain, fog, snow, dust and darkness, hardly influence the sensing reliability thereof. However, the resolving power thereof has been limited thus far, and series-produced radars in use have an angular resolution (in the azimuth or elevation direction) of approximately 7°. To meet the requirements for what are known as Levels 4 and 5 of automated driving (fully automated driving) encompassing a safe driving function, radar sensors, three-dimensional images having a high resolution in the range of 0.1° and below, having a low sensitivity with respect to interferences from the surrounding area thereof, are desirable. This cannot be achieved using conventional radar technology since the resolving power of such systems is too low.

Current developments of so-called photonic radar systems for increasing the resolving power rely on the co-integration of electronic and photonic components in a single semiconductor. The generation of the frequency-modulated continuous-wave (FMCW) signal as well as the entire signal processing and signal evaluation operation are carried out by a central station comprising a central processor circuit. Each transmitting and receiving module is made of an electronic-photonic integrated circuit (EPIC) chip. Silicon photonics technologies are used for the co-integration. This enables the monolithic integration of photonic components, high-frequency electronics and digital electronics together on a chip ("electronic-photonic co-integration"). The technical innovation of such a system lies in the signal transmission of GHz signals using an optical carrier signal in the THz frequency range. A central station generates an optical carrier oscillation (THz). The signal to be transmitted is modulated at, for example, ⅛ of the radar frequency and is transmitted to the antenna chips via optical fiber. On these, the frequency is increased eightfold, so that the radar radiation can be emitted by the antenna chips in the original form thereof. The signal detection accordingly takes place in the reverse process. All data are processed on the central station by the processor circuit. As a result of such EPIC chips being distributed across a large area on the vehicle surface and the coherent signal processing of the individual antennas, the resolving power can be refined to the range of 0.3° to 0.05° (that is, for example, 0.1°).

However, calculating all detections of target objects (for example in the form of a range Doppler azimuth elevation matrix) is extremely computationally intensive since, on the one hand, there are many so-called resolution cells (in the dimensions range, relative velocity, azimuth angle, elevation angle) and, on the other hand, a large number of combinations of receiving antennas (Rx antennas) and transmitting antennas (Tx antennas) have to be considered together due to multiple input multiple output (MIMO) methods. This results in a high overall computing complexity, that is, the number of multiplications can absolutely exceed the computing capacity of a conventional processor circuit for real-time processing. Even with a parallelized calculation approach on multiple high-performance GPU chips, the overall complexity is very high.

A two-stage radar system for recognizing a current vehicle pose of a motor vehicle is known from the scientific paper by De Martini et al. (Daniele De Martini, Matthew Gadd, Paul Newman, "kRadar++: Coarse-to-Fine FMCW Scanning Radar Localisation," Sensors 2020, 20, 6002; doi:10.3390/s20216002). In a first processing step, a location of the motor vehicle is ascertained based on the signal data of the digital antenna signals of a radar system, so as to then, in a second processing step, ascertain the spatial orientation of the motor vehicle. This two-stage approach makes it possible to use an artificial neural network for processing the signal data.

Two-stage processing of signal data of the digital antenna signals of a radar system is also known from U.S. Pat. No. 6,252,540 B1. The document describes that, in a first processing stage, the signal data of the radar system are employed to utilize target detection for recognizing or detecting objects in an environment of a motor vehicle. In the second processing stage, statistical analyses are applied to the result of the recognition.

It is known from U.S. Pat. No. 8,744,744 B2 to divided an environment of a motor vehicle into cells using a grid, and to then monitor by means of a processor circuit, for each cell based on signal data of a radar system, which of the cells is presently occupied, that is, in which of the cells an object, such as, for example, another road users, is presently situated. For a first estimation, the pieces of radar information from multiple cells are combined into a rough cell to obtain a first estimation as to whether any one of the cells contained therein is occupied. Only when occupancy is recognized overall for the blended rough cell is the computationally complex calculation of an occupancy probability carried out for the cells contained therein. Since the rough cells are formed by blending the pieces of radar information of the individual cells, this means that initially the antenna signals for each of the individual cells must have been completely evaluated. This, however, can be very computationally complex, in particular in the case of the above-described EPIC technology and despite parallelized computing methods.

SUMMARY

Aspects of the present disclosure are directed to reducing the computing complexity for a target detection (detection of at least one object in an environment of the radar system) in a radar system.

Some aspects are disclosed in the subject matter of the independent claims. Other aspects of the present disclosure are described by the dependent claims, the following description, and the figures.

In some examples, a method is disclosed for operating a radar system comprising multiple antennas. For cyclically conducted measurement cycles, a processor circuit receives a respective antenna signal in each case from each of the antennas, which is converted into a digitized or digital antenna signal by means of analog-to-digital conversion. The radar system repeats the measurement cycles cyclically or periodically in the manner known per se, to generate a radar image of the environment for each measurement cycle. The antennas can each be based on an EPIC chip, for example, as described; however, they may also be based on a different radar technology. A respective digital antenna signal represents a raw signal, to which no target detection has yet been applied. This may, for example, be a digitized signal, downmixed to baseband, from a mixer or an I/Q demodulator. In other words, only little processor power is required to generate the signal data of the digital antenna signals, and in particular no algorithm must be applied for a target detection. In particular, the signal data may be generated by a dedicated signal processor. The signal data of the digital antenna signals of the individual antennas are provided in a data memory or kept stored there. As a result, only little computing power is necessary until the provision of the signal data.

In some examples, a processor circuit is disclosed for a radar system, wherein the processor circuit is configured to carry out an embodiment of the method according to the present disclosure. Such a processor circuit can be implemented, for example, based on at least one microprocessor and/or microcontroller and/or at least one digital signal processor (DSP) and/or at least one application-specific integrated circuit (ASIC). The processor circuit can furthermore include the described data memory. The processor circuit can furthermore store program instructions, which, when executed by the processor circuit, prompt the circuit to carry out the aforementioned embodiment of the method. The program instructions can likewise be stored in the processor circuit, for example on a flash drive and/or a solid-state drive (SSD) and/or the data memory. The data memory can, for example, be implemented as random access memory (RAM).

In some examples, the present disclosure comprises a radar system comprising multiple antennas for converting electromagnetic echo signals into antenna signals, and an analog-to-digital converter (ADC) for an analog-to-digital conversion of the antenna signals of the antennas. In some examples, the processor circuit according to the present disclosure is coupled to the analog-to-digital converter. The radar system may be a configuration of the described photonic radar system, as described at the outset. The antennas can be based on EPIC chips, as described herein.

In some examples, the present disclosure also comprises a motor vehicle that includes the radar system according to the present disclosure. The motor vehicle can be an automobile, such as, for example, a passenger car, or a truck, or a street car or an airplane or a ship, just to mention examples of possible motor vehicles.

The present disclosure also encompasses the combinations of the features of the described embodiments.

BRIEF DESCRIPTION OF THE DRAWINGS

Exemplary embodiments of the present disclosure are described hereafter. In the drawings.

DETAILED DESCRIPTION

Figure 1:
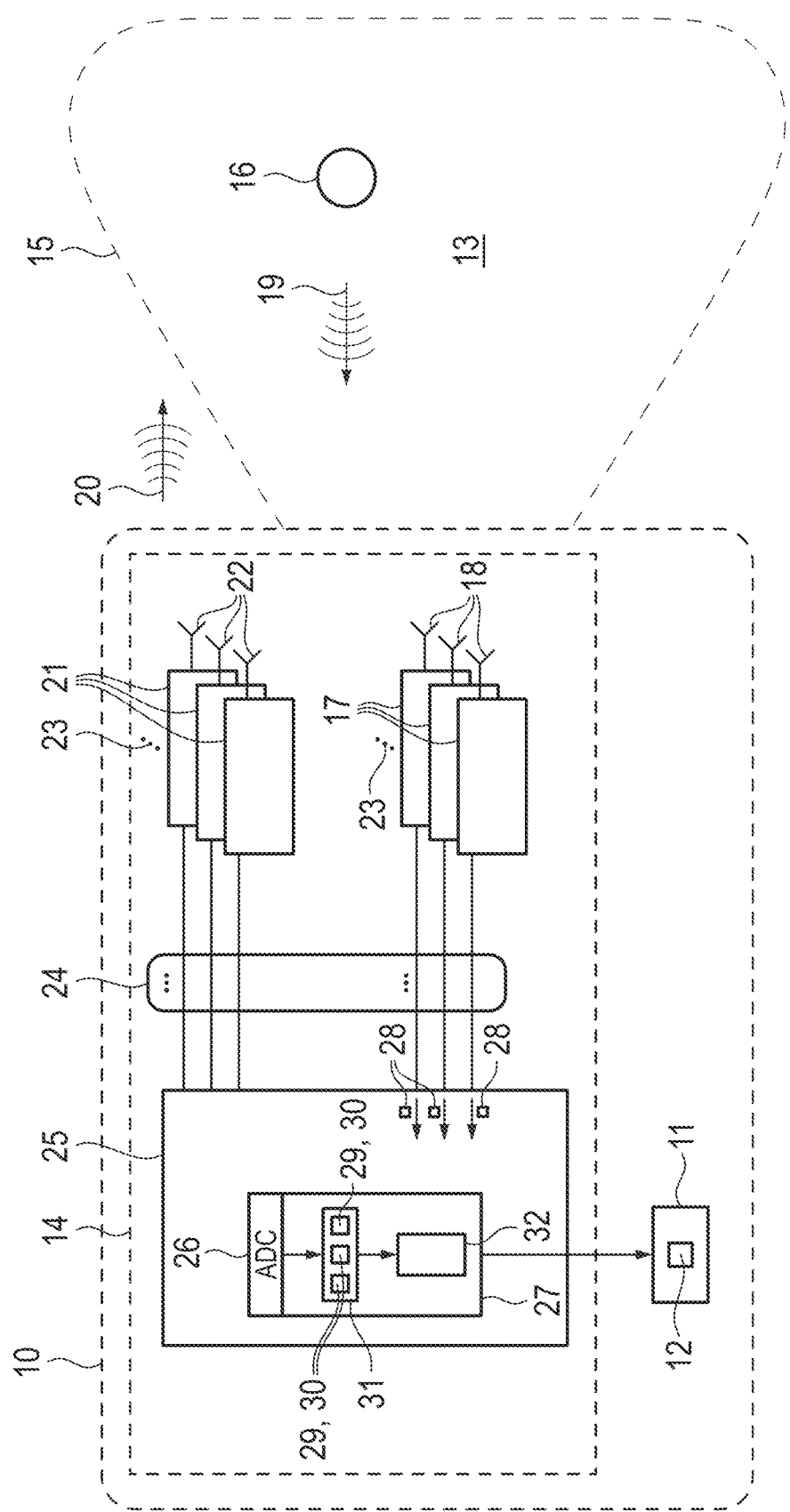
FIG. 1 shows a schematic illustration of a motor vehicle according to some aspects of the present disclosure.

The exemplary embodiments described hereafter are preferred exemplary embodiments of the present disclosure. In the exemplary embodiments, the described components in each case represent individual features of the present disclosure which are to be considered independently of one another and which also refine the present disclosure independently of one another and, as a result, shall also be considered to be an integral part of the present disclosure, either individually or in a combination other than the one shown. Furthermore, the described exemplary embodiments can also be supplemented with additional of the above-described features of the present disclosure.

In the figures, functionally equivalent elements are each denoted by the same reference numerals.

In some examples described in greater detail below, a predetermined monitoring area in a surrounding area or an environment of a radar system is examined for the presence of at least one object during a signal evaluation by means of the signal data of the digital antenna signals. The monitoring area can be a detection area (detection range) of the radar system. To make the signal evaluation efficient, in terms of computing, for the entire monitoring area, the signal evaluation may be configured with a two-stage design, and in a first processing step, only a predetermined subset of the signal data is supplied to an evaluation module, which carries out a first target detection based on the subset of the signal data in the entire monitoring area via first so-called resolution gates. The described evaluation module can be tangibly-embodied software, for example, which is executed by the processor circuit. The term "resolution gates" as used herein denotes a generalization of the term "range gate," that is, the measure known for radar signal processing or signal evaluation of combining signal portions of the antenna signals by integration over the time, for example to detect the signal power or signal energy in the integrated time segment. A resolution gate can in each case be provided for the dimension or measured variable that is range, velocity, azimuth, elevation, or a combination thereof (so-called multi-dimensional resolution gate). This is known per se from the state of the art. However, not all signal data are used in the first processing step, that is, only a segment or a portion of the digital antenna signals generated or available during the measurement cycle is supplied to the evaluation module, resulting in reduced resolving power for the target detection. In other words, in the first processing step, the entire environment or the entire monitoring area is examined or checked using fewer than the available signal data by means of a coarser or low-resolution target detection. The resolution gates divide the monitoring area into a cell grid having a first resolution (coarse resolution). This means that each resolution gate corresponds to or yields one resolution cell of the cell grid. A resolution cell thus corresponds to the subregion of the monitoring area that is covered or monitored by means of an assigned resolution gate. The underlying subset of the signal data is selected in such a way that in fact more signal data are available in the data memory for the target detection in each resolution gate; however, not all signal data or pieces of information available for the particular resolution gate are in fact utilized or supplied to the evaluation module. An algorithm available from the prior art can be resorted to for the particular target detection.

Then, those resolution cells for which, in the first processing step, the associated resolution gate meets a predetermined occupancy criterion are selected, and only the signal data available in the data memory for the selected resolution cells are selected for these resolution cells. In other words, it is recognized by way of the occupancy criterion which of the resolution cells potentially includes an object. With this, it is also known which of the overall available pieces of signal data have to be supplied to the evaluation module again and/or additionally for a further, in particular higher-resolution, signal evaluation. For a given measurement cycle, these do not have to be all signal data, so that it is prevented in this way that signal data that are only relevant for resolution cells for which no indication of an object exists are processed unnecessarily.

In a second processing step, the selected signal data are then supplied to the evaluation module, which based on the selected signal data in each case only carries out a target detection in the selected resolution cells by means of second resolution gates a second target detection [sic], which provide a greater or finer resolution of the particular dimension or measured variable, that is, they divide the particular resolution cell into a sub-cell grid having a second resolution (fine resolution) that is finer compared to the first resolution. In other words, a resolution cell for which the occupancy criterion is met is divided into sub-cells, and the target detection is carried out individually or separately in the sub-cells. For this purpose, only those signal data that are relevant for the sub-cells are then resorted to. In particular, it is then also only necessary to carry out those calculations, using the selected signal data, which are relevant for the target detection in the particular sub-cell. In contrast, signal data that are only relevant for unoccupied resolution gates are identified and can remain without consideration in the first and second processing steps. In this case, carrying out calculations for the remaining resolution cells can be dispensed with, which advantageously saves calculation steps.

The present disclosure thus yields the advantage that, proceeding from the raw data, that is, the signal data of the digitized antenna signals, only those signal data are used for the target detection having the greater or finer second resolution (fine resolution), and that the calculations are only carried out in those resolution cells, for which any indication of a possible object resulted in the first processing step based on the subset of the signal data by means of the occupancy criterion. This saves a plurality of calculation steps per measurement cycle.

The present disclosure also includes examples that yield additional advantages.

In one some examples, a radar image for the entire monitoring area is formed of respective results data of the first target detection for those resolution cells of the first cell grid for which the occupancy criterion is not met, and of respective results data of the second target detection for those resolution cells that meet the occupancy criterion. In this way, an overall image of the environment is advantageously provided, even though the second target detection was only carried out for the selected resolution cells that meet the occupancy criterion. For the remaining resolution cells, the detection result of the first target detection, that is, the results data thereof, can be used for the entire resolution cell.

In some examples, at least one of the following reductions results from the predetermined subset of the signal data, compared to a total of the signal data of the particular measurement cycle:
  a reduced number of antennas and/or
  a reduced sampling rate of the analog-to-digital conversion and/or
  a limited bandwidth and/or
  a limited measuring time.

In this way, the number of available antennas can be (artificially) reduced compared to or for the evaluation module in that signal data of at least one antenna remain without consideration. By reducing the sampling rate, a frequency resolution of the analog-to-digital conversion can be decreased. A limited bandwidth can, for example, be achieved by low pass filtering or band pass filtering or raw pass filtering. A limited measuring time can, for example, be achieved by trimming or cutting out a time segment of a digitized antenna signal. These measures have proven to be advantageous since they are suitable for allowing the use of a conventional evaluation model even in the first processing step, without necessitating a special adaptation of the evaluation module. The measuring time can also be adapted based on Fast Fourier transforms (FFT). The described reduction of the signal data can simplify so-called compressive sensing hypotheses and/or can simplify constant false alarm rate (CFAR) calculations.

In another example, antenna signals may be configured as echoes of an (electromagnetic) chirp signal or of multiple such chirp signals, and that only a low-frequency signal component or signal portion of the particular chirp signal is comprised by the predetermined subset of the signal data. A chirp signal is a signal in which the frequency continuously increases or continuously decreases over time, so that there is a low-frequency signal component at the beginning of the chirp signal, or at the end thereof. In this way, it is possible to ascertain the low-frequency signal component by simply selecting a first or a last sub-portion of the antenna signal. By selecting the length of the signal portion, it is possible to decide up to which cut-off frequency the low-frequency signal component is being selected. This is a particularly simple processor operation, by way of which a subset of the signal data can be efficiently selected in the data memory.

In some examples, the resolution gates each may have a one-dimensional or multi-dimensional design, and that respective resolution gates are provided for at least one of the following measured variables or "dimensions:" range, relative velocity in the radial direction, relative velocity in the tangential direction, azimuth angle, and elevation angle. This results in resolution gates that are accordingly referred to as range gates, velocity gates, azimuth gates or elevation gates. By combining two or more than two of these measured variables in each case, the above-described respective multi-dimensional resolution gate is obtained, for example a combination of range and azimuth angle.

In some examples, the occupancy criterion is configured such that a signal power of the antenna signals in the respective resolution gate, as determined based on the subset of the signal data, is greater than a predetermined threshold value. An occupancy criterion that is particularly efficient for the calculation can thus be implemented by a threshold value comparison The threshold value can be established as a function of the cell size of the particular resolution cell. The calculation of the signal power can, for example, include an integral of the squared signal values of an antenna signal or of a combination (formed, for example, by beamforming) of multiple antenna signals over time.

In some examples, the occupancy criterion encompasses that a predetermined machine learning model (AI, artificial intelligence), such as an artificial neural network, signals an occupancy of the particular resolution cell based on the subset of the signal data. By appropriately training such a model, an occupancy of a resolution cell can be detected or identified. In particular, artificial deep neural networks (for example, DNN, CNN, recurrent neural networks and spiking neural networks) have proven to be suitable machine learning algorithms Compared to a threshold value comparison, the use of a machine learning model can yield the advantage that additional pieces of information or criteria, for example the further resolution cells adjoining a resolution cell to be checked, and/or a signal pattern of multiple resolution cells can be taken into consideration. Using appropriate training data, for which also so-called label data, that is, the correct detection result or the so-called Ground Truth, are provided, a machine learning model can be accordingly trained or prepared.

In some examples, compared to the first target detection, the second target detection additionally comprises at least one predetermined super resolution algorithm. Examples of such super resolution algorithms are MUSIC, ESPRIT, KEYSTONE, SAR, which, even though they are computationally intensive, only have to be applied in the second processing step of the method to the selected resolution cells, whereby these super resolution algorithms are rendered usable or applicable in a radar system, in particular in a radar system for a motor vehicle and/or under real-time requirements.

In some examples, the first processing step and the second processing step can be repeated at least once iteratively, wherein, in the first processing step, in each case those sub-cells of the sub-cell grid are used as a basis for the particular repetition, instead of the entire monitoring area, which in the preceding second processing step in each case meet the occupancy criterion. In other words, during the next iteration an individual selected sub-cell can be regarded as a monitoring area again, which is subdivided by means of further resolution gates. In this way, it can be prevented that unnecessary calculations are carried out within a selected resolution cell for those sub-cells for which it was already recognized in a preceding iteration that no object is present there.

FIG. 1 shows a motor vehicle 10, which can, for example, be a car, such as a passenger car. The motor vehicle 10 can, for example, be in the process of driving on a road. The motor vehicle 10 can, for example, be guided by an autopilot 11, by which an autonomous driving function 12 (for example, including automated longitudinal guidance and/or lateral guidance) can be provided. The autopilot 11 can be implemented based on a control unit or a combination of multiple control units.

In this example of an automated driving function, an outside surrounding area or an environment 13 of the motor vehicle 10 is detected via a radar system 14, which can monitor a monitoring area 15 in the environment 13 as to whether at least one object 16 is present therein, and where this object 16 is situated relative to the motor vehicle 10. The monitoring area 15 may extend around the entire motor vehicle 10 (that is, 360°, horizontally). For this purpose, the radar system 14 includes antenna modules 17, by which antennas 18 for receiving radar echoes 19 can be provided. The radar echoes, or "echoes" 19 for short, can be echoes of electromagnetic radar signals 20, which can have been emitted by transmitting modules 21 via corresponding transmitting antennas 22. The emission of radar signals 20 and the reception of echoes 19 can be repeated periodically or at predetermined points in time in consecutive measurement cycles. Ellipses 23 symbolize that the illustrated number of antennas 18 and transmitting antennas 22 is only by way of example. The antenna modules 17 and the transmitting modules 21 can be connected, by way of example, via an analog signal connection 24 to a central station 25, which can comprise an analog-to-digital converter 26 (ADC) and a processor circuit 27. Additional components of the central station 25 are not shown in the illustration for simplicity reasons.

From the antennas 18, antenna signals 28 can be received via the analog signal connection 24 in the central station 25, and in the analog-to-digital converter 26. From this, digital antenna signals 29 can be generated in the manner known per se by the analog-to-digital converter 26, the signal data 30 of which can be stored in a data memory 31. Proceeding from the signal data 30, the method described hereafter can be carried out for each measurement cycle, based on an evaluation module 32. The evaluation module 32 can, for example, stem from the prior art in the manner known per se.

Figure 2:
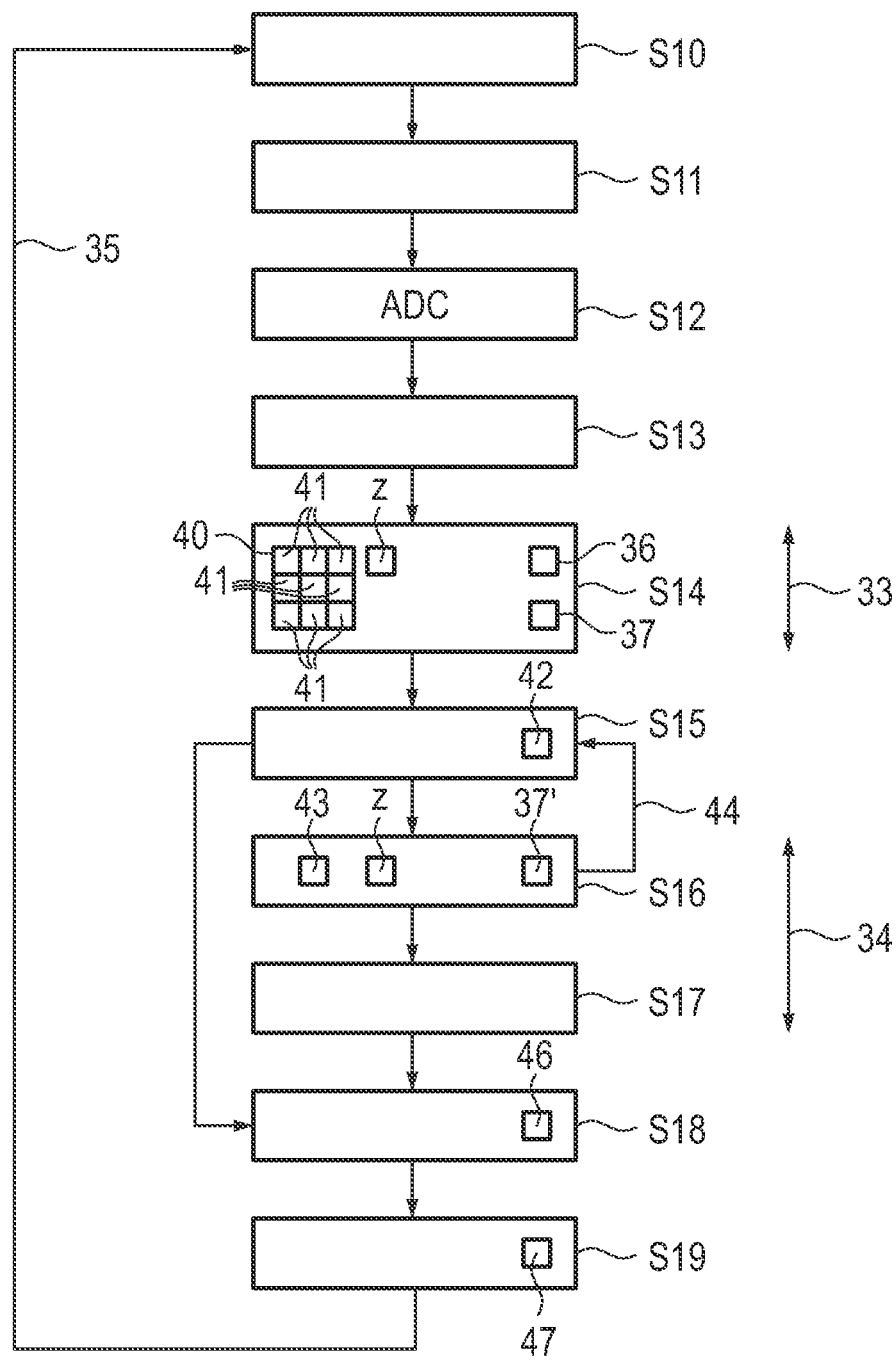
FIG. 2 shows a flow chart of a method according to some aspects of the present disclosure.

FIG. 2 illustrates the method, which can comprise two processing stages or processing steps 33, 34, so as to implement the target detection for detecting the objects 16 based on the digital antenna signals 29. For this purpose, FIG. 2 illustrates in a flow chart how, for each measurement cycle, in a step S10 electromagnetic waves of the echoes 19 can be received at the antennas 18. The total number of antennas 18 for receiving the echoes 19 is denoted by N here. In a step S11, the data transmission to the analog-to-digital converter 26 can take place. In a step S12, the digital antenna signals 29 can be generated by the analog-to-digital converter 26, that is, the scan data or signal data 30 are generated. In a step S13, the scan samples or signal data 30 can be stored in the data memory 31. In this way, the signal data 30 of the digital antenna signals 29 are available for the first method step 33.

In a step S14, this can provide, for example, the calculation of FFTs/compressive sensing hypotheses/CFAR/resolution gates, for example, for range, velocity, azimuth and/or elevation in the evaluation module 32, based on only a subset 35 of the signal data 30. It is possible, for example, to provide n<N antennas and/or, per antenna, fewer than the overall available signal data 30 or samples of the analog-to-digital converter and/or digital antenna signals having a limited bandwidth (for example, due to band pass filtering or low pass filtering) and/or having a limited measuring time (trimming of the digital antenna signals in terms of time), as was already described above.

The limitation to only a subset of the signal data results in resolution gates having a comparatively low resolving power. Each resolution gate represents or monitors a resolution cell. The shape of the resolution cells defines a cell grid 40 including resolution cells 41, of which each resolution cell 41 corresponds to a resolution gate. The cell grid 40 can cover the entire monitoring area 15. It is now possible to check for each resolution cell 41 by means of the occupancy criterion 37 whether a probability for an object 16 in the particular resolution cell 41 is greater than a predetermined minimum value. In the process, an occupancy criterion 37 can be checked for individual resolution cells, for which purpose, for example, a machine learning model, for example an artificial neural network, such as a DNN or one of the other models, is utilized.

In a step S15, all resolution cells 41 for which the occupancy criterion 37 is met can be selected.

In a step S16, it is then possible, as part of the second processing step 34, to carry out a target detection again by means of the evaluation module 32, this time a second target detection Z, which can be carried out based on additional or other signal data 30, which can be selected from the data memory 31 according to the selected resolution cells 41.

For the selection 42 of resolution cells 41, for example, in each case signal data of up to N antennas can be used, in particular all antennas relevant for the resolution cell 41 (which, for example with respect to this resolution cell 41, are not blocked by the motor vehicle 10 itself). Optionally, it is possible by means of a for the selected resolution cells 41.

This results in a sub-cell grid for each selected resolution cell, for the sub-cells 43 of which optionally an occupancy criterion 37' can be applied to carry out an optional recursion or iteration 44.

It is also possible in a step S17, for example, to apply super resolution algorithms, such as have already been described, for the selected resolution gates, due to the lower number of signal data 30 to be used.

In a step S18, it is then possible to merge the results data 46 from the occupied resolution cells (results data 46 from the second method step 34 and the results data from the unoccupied resolution gates (results data from the first processing step 33)), and in a step S19 to generate an overall image 47 of the monitoring area 15 therefrom. For example, a coordinate transformation of the point cloud and a forwarding to an environment model of the autonomous driving function 12 can take place.

Figure 3:
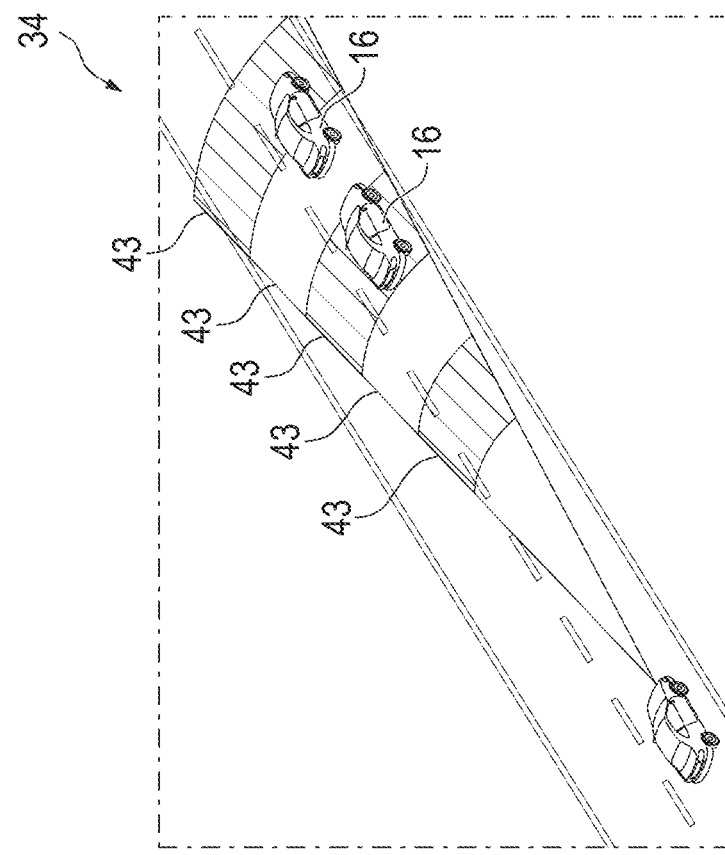
FIG. 3 shows an example of resolution cells of a cell grid of a first resolution and sub-cells of a cell grid of a second resolution for one-dimensional resolution gates according to some aspects of the present disclosure.
Figure 3:
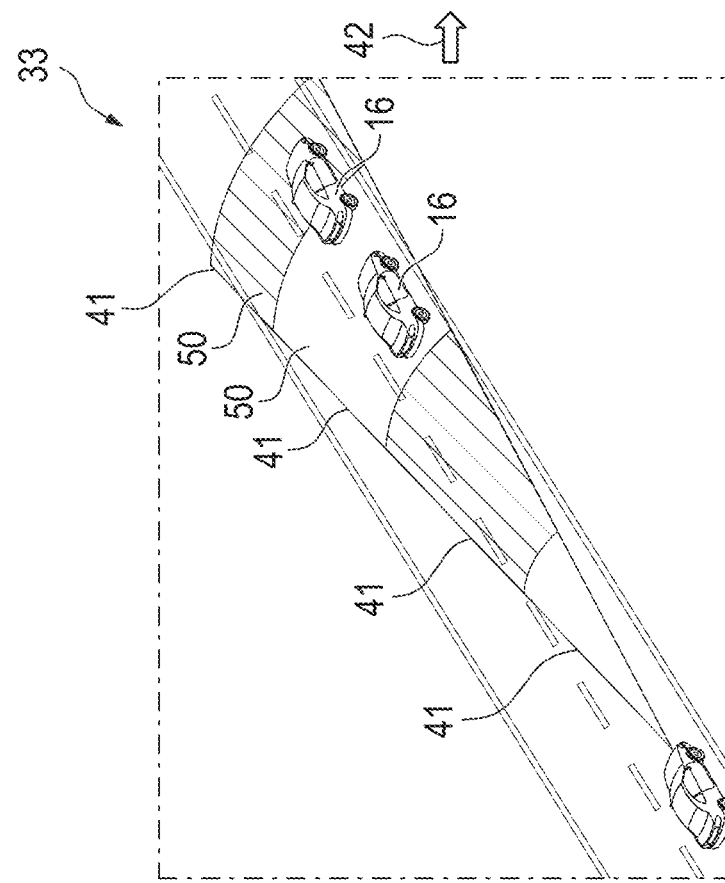

FIG. 3 illustrates the first processing step 33 and the second method step 34 based on the example of range gates as one example of one-dimensional resolution gates. In the first processing step 33, as shown by way of example in FIG. 3, four resolution cells 41 can be formed, and it is possible to recognize that the accordingly resulting resolution cells 41 two objects 16 are detected in two occupied resolution cells or occupied cells 50 by means of the occupancy criterion 37 [sic]. As a result of the selection 42 of the occupied cells 50, the second processing step 34 can be limited to these occupied cells 50, and a sub-cell grid comprising sub-cells 43 can be formed there by appropriately selecting further or other signal data 30, and by forming or calculating corresponding resolution gates, so as to enlarge or increase a range resolution for the objects 16 compared to the first processing step 33. For example, it may also be provided that a distinction between two different objects is not made until the second processing step 34, in that accordingly finely resolved sub-cells 43 are generated with the sub-cell grid.

In FIG. 3, this technique for reducing the computing complexity is visualized by way of example in the target range dimension. As an alternative to the dimension 'target range', this technique can also be employed for the remaining dimensions of the radar, these being relative velocity in the radial direction and/or relative velocity in the tangential direction and/or azimuth angle and/or elevation angle. Depending on the computing complexity that arises, it can be advantageous to apply the method for one of the described alternative dimensions or to combinations of the described alternative dimensions.

Figure 4:
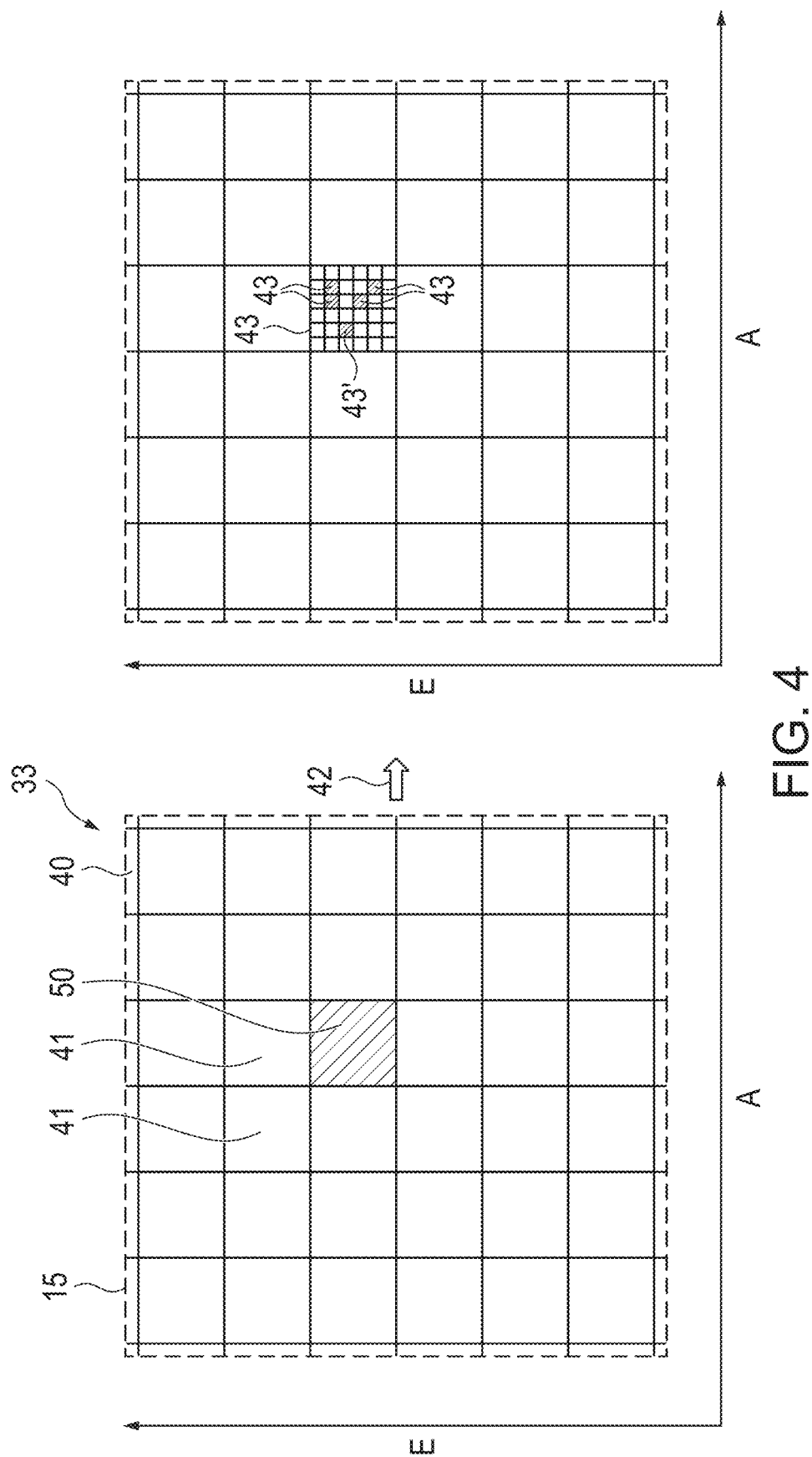
FIG. 4 shows an example of resolution cells of a cell grid of a first resolution and of sub-cells of a cell grid of a second resolution for two-dimensional resolution gates according to some aspects of the present disclosure.

FIG. 4 visualizes this technique by way of example for the dimension azimuth angle and elevation angle. FIG. 4 illustrates for two-dimensional resolution gates, by which a cell grid 40 made of resolution cells 41 and a sub-cell grid made of sub-cells 43 formed therein for the azimuth angle A and the elevation angle E [sic]. In the processing step 33, the occupancy criterion 37 can be checked for the resolution cells 41 (only some are denoted by a reference numeral for the sake of clarity), and the occupancy criterion 37 can be met for one occupied cell 50. This occupied call 50 can be selected, and the sub-cell grid of the sub-cells 43 having a finer resolution can be formed therein by second resolution gates, so as to detect occupied sub-cells 43', and thereby recognize the position of at least one object 16.

With this, it is achieved that the data volume to be calculated is reduced for high-resolution radar systems, and that a reliable, high-resolution object detection is obtained. High-resolution, imaging 3D radar systems in fact require extensive computing capacity for processing the data, such as, for example, the calculation of a range-Doppler matrix.

As a result of the described, following approach, an increase in efficiency can be achieved:
  i. Roughly resolved scan in the entire field of view (monitoring area 15). Detection of the occupied range-Doppler cells (resolution cells).
  ii. Finely resolved scan/processing of the occupied range-Doppler cells for high-resolution object detection.
  iii. Merging the two cans from i. and ii. results in a complete image of the environment, including all the necessary information.

The following advantages are achieved:
  i. Reduction of the necessary computing power
  ii. Energy savings since fewer calculations are required
  iii. Cost savings in the control unit To reduce the complexity of the problem, a two-stage signal evaluation is carried out. In the first processing step, a deliberately coarser resolution is processed (see FIG. 3, on the left, based on the example of a course range resolution), and a target detection is carried out. This can be completed with moderate complexity. If target detections can be recognized in the coarse resolution cells, a finer resolution is processed in a second processing step for precisely these selected resolution cells (see FIG. 3, on the right, based on the example of a fine range resolution). A corresponding target detection then discloses the targets actually present in the scene with a finer resolution. The computing complexity has been drastically reduced in that only few resolution cells must be calculated.

The technique for reducing the computing complexity for high-resolution radar sensors, as described in the present disclosure, is an advantageous procedure at the present time to be able to calculate the "data cube" of a modern radar in real time at all. This applies both to the case where conventional linear processors are used in control units, and for today's parallel processing units.

This makes it possible, from a computing complexity point, for radar sensor systems to penetrate into resolution ranges that, at least in terms of the angle, have previously been reserved for laser sensors and cameras. With this, a weather-independent and reliable high-resolution sensor would be available for monitoring the vehicle environment for automatic driving.

In this way, the data volume to be processed can already be reduced based on the raw radar signals. The identification of the relevant resolution cells and the sequential post-processing with a finer resolution take place in two stages. In the process, at least one of the following variables can be adapted: the bandwidth of the sampling rate of the ADCs, the number of antennas, the frequency bandwidth, the measuring time based on FFTs, compressive sensing hypotheses, CFAR calculations, range gates, velocity gates, azimuth gates or elevation gates can be reduced. In particular the use of machine learning algorithms, such as artificial deep neural networks (for example DNN, CNN, recurrent NN, spiking NN), can be used to identify the occupied resolution cells. Furthermore, these AI methods can be used to reduce or increase the resolving power.

LIST OF REFERENCE NUMERALS 10 motor vehicle
11 autopilot
12 driving function
13 environment
14 radar system
15 monitoring area
16 object
17 antenna module
18 antennas
19 echo
20 radar signal
21 transmitting module
22 antenna
23 ellipsis
24 signal connection
25 central station
26 analog-to-digital converter
27 processor circuit
28 antenna signal
29 antenna signal
30 signal data
31 data memory
32 evaluation module
33 processing step
34 processing step
35 subset
37 occupancy criterion
40 cell grid
41 resolution cell
43 sub-cell grid
44 iteration
46 results data
47 overall image
50 occupied cell

The invention claimed is:

1. A method for operating a radar system for a vehicle, comprising:
receiving signal data from a data memory, the signal data comprising digital antenna signals associated with a plurality of antennas detecting a monitoring area, wherein each of the plurality of antennas are respectively associated with first and second resolution gates;
processing, via an evaluation module, a subset of the signal data to produce a first target detection having a first resolution comprising a cell grid having a plurality of resolution cells and corresponding first resolution gates;
selecting resolution cells in which the corresponding first resolution gates meet an occupancy criterion; and
processing, via the evaluation module, the selected resolution cells to produce a second target detection having a second resolution comprising a sub-cell grid having a plurality of resolution sub-cells and corresponding second resolution gates, wherein the second resolution is finer than the first resolution.

2. The method of claim 1, further comprising determining one or more of (i) range, (ii) relative velocity in a radial direction, (iii) relative velocity in a tangential direction, (iv) azimuth angle, and (v) elevation angle, via the first target detection and/or the second target detection.

3. The method of claim 1, further comprising forming a radar image for the monitoring area based on (i) first target detection results not meeting the occupancy criterion, and (ii) second target detection results for selected resolution cells meeting the occupancy criterion.

4. The method according to claim 3, wherein the occupancy criterion comprises resolution gates of the respective antenna signals having signal power that is greater than a predetermined threshold value.

5. The method according to claim 1, wherein the digital antenna signals comprise echoes of at least one chirp signal.

6. The method according to claim 5, wherein the subset of the signal data comprises a low-frequency signal portion of the chirp signal.

7. The method according to claim 1, wherein the occupancy criterion comprises resolution gates of the respective antenna signals having signal power that is greater than a predetermined threshold value.

8. The method according to claim 1, wherein the occupancy criterion comprises a signal pattern of a machine-learning model.

9. A radar system for a vehicle, comprising:
a plurality of antennas for detecting a monitoring area of the vehicle;
a data memory configured to receive signal data comprising digital antenna signals associated with the plurality of antennas, wherein each of the plurality of antennas are respectively associated with first and second resolution gates; and
an evaluation module, wherein the evaluation module is configured to
process a subset of the signal data to produce a first target detection having a first resolution comprising a cell grid having a plurality of resolution cells and corresponding first resolution gates;
select resolution cells in which the corresponding first resolution gates meet an occupancy criterion; and
process the selected resolution cells to produce a second target detection having a second resolution comprising a sub-cell grid having a plurality of resolution sub-cells and corresponding second resolution gates, wherein the second resolution is finer than the first resolution.

10. The radar system of claim 9, wherein the evaluation model is configured to determine one or more of (i) range, (ii) relative velocity in a radial direction, (iii) relative velocity in a tangential direction, (iv) azimuth angle, and (v) elevation angle, via the first target detection and/or the second target detection.

11. The radar system of claim 9, further comprising a processing apparatus configured to form a radar image for the monitoring area based on (i) first target detection results not meeting the occupancy criterion, and (ii) second target detection results for selected resolution cells meeting the occupancy criterion.

12. The radar system according to claim 9, wherein the digital antenna signals comprise echoes of at least one chirp signal.

13. The radar system according to claim 12, wherein the subset of the signal data comprises a low-frequency signal portion of the chirp signal.

14. The radar system according to claim 9, wherein the occupancy criterion comprises resolution gates of the respective antenna signals having signal power that is greater than a predetermined threshold value.

15. The radar system according to claim 9, wherein the occupancy criterion comprises a signal pattern of a machine-learning model.

16. A method for operating a radar system for a vehicle, comprising:
  receiving signal data from a data memory, the signal data comprising digital antenna signals associated with a plurality of antennas detecting a monitoring area, wherein each of the plurality of antennas are respectively associated with first and second resolution gates;
  processing, via an evaluation module, a subset of the signal data to produce a first target detection having a first resolution comprising a cell grid having a plurality of resolution cells and corresponding first resolution gates;
  selecting resolution cells in which the corresponding first resolution gates meet an occupancy criterion; and
  processing, via the evaluation module, the selected resolution cells to produce a second target detection having a second resolution comprising a sub-cell grid having a plurality of resolution sub-cells and corresponding second resolution gates, wherein the second resolution is finer than the first resolution; and
  determining one or more of (i) range, (ii) relative velocity in a radial direction, (iii) relative velocity in a tangential direction, (iv) azimuth angle, and (v) elevation angle, via the first target detection and/or the second target detection.

17. The method of claim 16, further comprising forming a radar image for the monitoring area based on (i) first target detection results not meeting the occupancy criterion, and (ii) second target detection results for selected resolution cells meeting the occupancy criterion.

18. The method according to claim 16, wherein the digital antenna signals comprise echoes of at least one chirp signal.

19. The method according to claim 18, wherein the subset of the signal data comprises a low-frequency signal portion of the chirp signal.

20. The method according to claim 16, wherein the occupancy criterion comprises a signal pattern of a machine-learning model.

* * * * *